US005156782A

United States Patent [19]

Ballantyne

[11] Patent Number: 5,156,782

[45] Date of Patent: Oct. 20, 1992

[54] MAINTAINING PRESS PLATENS IN PARALLEL RELATIONSHIP

[75] Inventor: Ronald Ballantyne, Burlington, Canada

[73] Assignee: John T. Hepburn, Limited, Mississauga, Canada

[21] Appl. No.: 769,820

[22] Filed: Oct. 2, 1991

[51] Int. Cl.[5] .............................................. B29C 43/58

[52] U.S. Cl. .................................. 264/40.5; 264/320; 425/149; 425/150; 100/46; 100/258 A

[58] Field of Search ..................... 264/40.1, 40.5, 319, 264/320; 425/135, 149, 150, 167, 406; 100/46, 258 R, 258 S

[56] References Cited

U.S. PATENT DOCUMENTS

| | | | |
|---|---|---|---|
| 4,076,780 | 2/1978 | Ditto | 264/40.5 |
| 4,615,857 | 10/1986 | Baird | 100/258 A |
| 4,784,058 | 11/1988 | Nakagawa et al. | 100/46 |
| 4,828,474 | 5/1989 | Ballantyne | 425/150 |
| 4,923,383 | 5/1990 | Kurumaji et al. | 264/40.5 |

*Primary Examiner*—Jill L. Heitbrink

*Attorney, Agent, or Firm*—Mirek A. Waraksa

[57] ABSTRACT

Press platens are maintained parallel in critical central regions proximate to a mold between the platens. Leveling cylinders acting between the platens to resist downward action of a central ram on a movable platen. Data identifying expected local platen deflection in response to various operating pressures of the leveling cylinders are recorded. For each leveling cylinder, the current operating pressure is determined and the relative spacing of the platens proximate to the leveling cylinder is sensed. The operating pressures of the cylinders are controlled in response to the sensed relative spacing of the platens and in response to the expected local platen deflection for each leveling cylinder at its current operating pressure to maintain a substantially parallel relationship between the platens proximate to the mold. The platen deflection data required for each leveling cylinder are obtained in a preliminary process involving operation of the platens to compress the mold, operating the leveling cylinders at their various operating pressures, and sensing and recording local platen deflection that results.

13 Claims, 2 Drawing Sheets

MAINTAINING PRESS PLATENS IN PARALLEL RELATIONSHIP

FIELD OF THE INVENTION

The invention relates generally to presses, and more particularly, to maintaining press platens in parallel relationship during compression of a workpiece.

BACKGROUND OF THE INVENTION

Hydraulic presses are now used extensively for compression molding of large and comparatively thin plastic products. Mold halves are fixed to upper and lower platens. The upper platen may typically be displaced under very substantial driving forces to compress a molding charge. Very strict control of platen parallelism is required to produce a satisfactory product. The planar platen surfaces that actually engage the molds may be required to deviate from a parallel relationship by no more than 0.001–0.005 inches per foot. A basic understanding of press parallelism control may be obtained by reference to U.S. Pat. No. 4,076,780 which issued on Feb. 28, 1978 to Ditto.

Many old hydraulic presses have a stationary lower platen and a movable upper platen that is displaced by a large overhead hydraulic ram. The guiding structures used to direct movement of the upper platen are generally inadequate to maintain the strict platen parallelism required for contemporary compression molding. To adapt such presses for such strict parallelism control, hydraulic leveling cylinders may typically be mounted at each corner on the lower platen. These act against the upper platen and apply forces countervailing the action to the central ram. Alternatively, the leveling cylinders may be fixed to the upper platen and engageable with the lower platen. Each leveling cylinder may be associated with a platen spacing sensor that indicates the relative spacing of the platens proximate to the leveling cylinder. Such sensors may comprise, for example, a magnetic track that displaces with the upper platen and a complementary sensor head that is fixed to the stationary lower platen. In an arrangement described in U.S. Pat. No. 4,828,474 to Ballantyne, the platen spacing sensors are actually built into the leveling cylinders. A microprocessor will typically control the leveling cylinders in response to the spacing signals to maintain a common spacing between the platens adjacent to each cylinder and, assuming limited overall deformation of the platens, a parallel relationship. The common spacing value is changed as the press proceeds through preliminary compression and curing phases of operation.

A very significant problem in such prior presses appears to have gone unnoticed. The inventor has initiated finite element analysis to assess overall platen deformation in typical platens during compression phases of operation. Such analysis has revealed very significant local relative deflection of the platens in response to operation of the leveling cylinders themselves. The amount of such deflection can approach the alignment tolerances that must be maintained in parallelism control and varies with the force exerted by each cylinder. Since the spacing sensors identify such local relative deflection as part of the spacing between the platens, the spacing signals produced by the sensors do not reflect the actual alignment of the platens in the critical regions proximate to the mold. Instead of maintaining parallelism in such critical regions, the control system may actually induce a significantly non-parallel relationship at the mold itself. Such a problem may arise in more contemporary presses, depending on their exact configuration. The present invention addresses this problem.

BRIEF SUMMARY OF THE INVENTION

In one aspect, the invention provides a method of maintaining platen parallelism while a molding charge is being compressed. The method is applicable to a press comprising a pair of platens, a mold located substantially centrally between the platens, means for applying a driving force to one of the platens to displace it towards the other platen thereby to compress a molding charge within the mold, and a plurality of leveling cylinders spaced from the mold and acting between the platens to apply forces that vary with the operating pressures of the cylinders to countervail the driving force. The method involves providing data identifying for each leveling cylinder the local relative deflection of the platens expected in response to operation of the leveling cylinder at various operating pressures (while the molding charge is being compressed). The current operating pressure of each leveling cylinder is determined. For each leveling cylinder, the relative spacing of the platens proximate to the leveling cylinder is sensed. The operating pressures of the leveling cylinders are controlled in response to the relative spacing of the platens as indicated for each leveling cylinder and in response to the data identifying the expected local relative platen deflection for each leveling cylinder at its current operating pressure, to maintain a substantially parallel relationship between the platens proximate to the mold. For purposes of this specification, "local relative deflection of the platens" for a leveling cylinder should be understood as the relative deflection of the platens away from one another proximate to the leveling cylinder. Such deflection affects readings of the sensors proximate to the leveling cylinders, whether physically separate from or incorporated into the leveling cylinders.

The data indicating expected relative deflection can be estimated for a particular platen with a typical mold or equivalent workpiece. Such estimates can be obtained by finite element analysis, but this is comparatively costly. The data may be stored on disk or other non-volatile memory, or an electronic means may be provided to generate the data. The data are preferably obtained through a preliminary process (prior to actual production runs) which involves positioning a workpiece centrally between the molds, and applying the driving force compress the workpiece between the platens. While the workpiece is being compressed, each leveling cylinder is operated at various operating pressures, the local relative deflection of the platens proximate to the leveling cylinder is sensed, and the sensed local relative deflection at the various operating pressures is recorded. This process may be used each time a mold is changed, using the new mold, preferably but not essentially with a sacrificial molding charge, as the workpiece, to condition press controls for subsequent molding operations. This process can also be repeated after each shut down of the press to recalibrate deflection data.

The invention also provides a press appropriately adapted to implement the above method of platen parallelism control and apparatus for retrofitting a pre-existing press for stricter platen parallelism control. Various aspects of the invention will be apparent from a description below of a preferred embodiment and will be more specifically defined in the appended claims.

DESCRIPTION OF THE DRAWINGS

The invention will be better understood with reference to drawings in which.

DESCRIPTION OF PREFERRED EMBODIMENT

Figure 1:
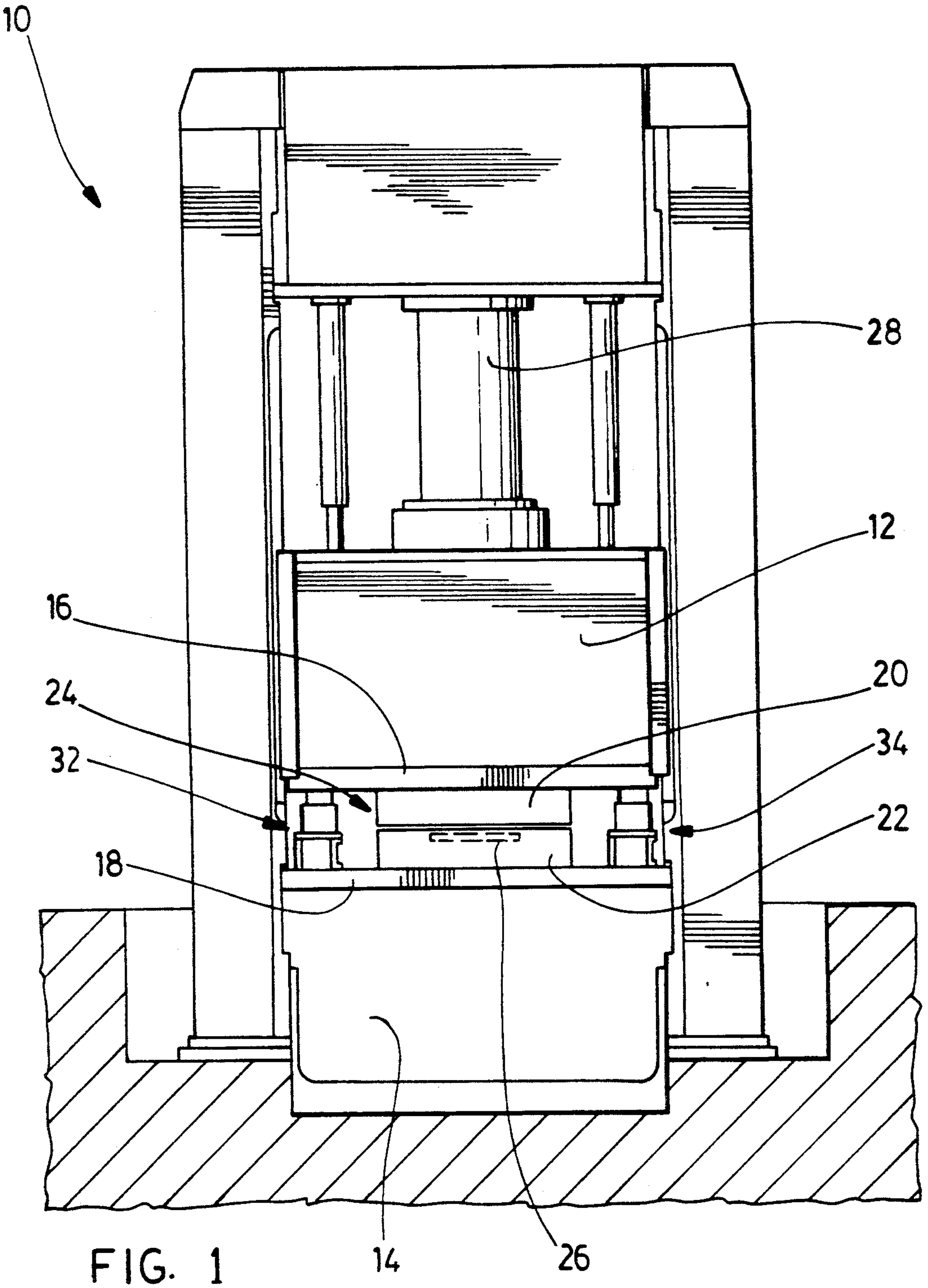
FIG. 1 is a fragment elevational view of a press embodying control features of the invention.

FIG. 1 illustrates a press 10 adapted for compression molding. The press 10 includes upper and lower platens 12, 14 respectively carrying upper and lower bolster plates 16, 18. Upper and lower halves 20, 22 of a mold 24 are fixed in a conventional manner to the platens 12, 14. A molding charge 26 has been diagrammatically indicated in phantom outline within the lower mold half 22. A large central ram 28 suspended from a cross-head permits substantial driving forces (typically up to 2000 tons) to be applied to the upper platen 12 to displace it towards the lower platen 14 to compress the molding charge 26.

Four leveling cylinders are fixed to the lower platen 14 in a conventional rectangular spacing arrangement with one at each corner of the lower platen 14. Only two forward leveling cylinders 32, 34 are illustrated, and these are identified herein as the "left" and "right" leveling cylinders, respectively. The leveling cylinders are spaced outwardly from the mold 24 and the central regions of the platens 12, 14 to facilitate access to the mold 24. The leveling cylinders act between the platens 12, 14 and apply upward forces to the upper movable platen to countervail the driving force of the central ram 28. Each leveling cylinder has an internal spacing sensor, such as the spacing sensor 36 associated with the left leveling cylinder 32, which detects relative spacing of the platens 12, 14 proximate to the cylinder. Details of construction of such spacing sensors will be apparent from U.S. Pat. No. 4,828,474 to Ballantyne, whose teachings are incorporated herein by reference. Details of the general construction and overall operation of such a press 10 will be apparent to those skilled in the art.

Figure 2:
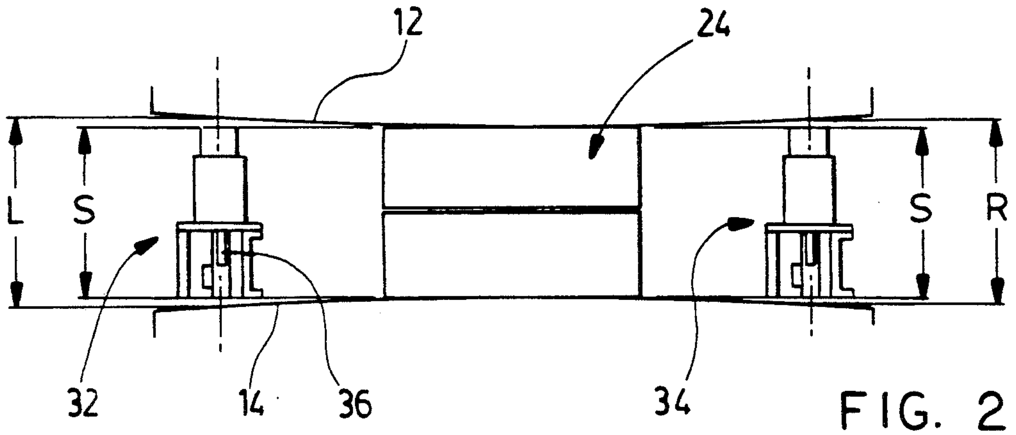
FIG. 2 diagrammatically illustrates local platen deflection proximate to two leveling cylinders of the press.

The problem associated with the prior art will be described with reference to FIG. 2. FIG. 2 shows the local relative deflection of the upper and lower platens 12, 14 proximate to the two leveling cylinders, grossly exaggerated. It should be understood that such deflection is expected to be in the order of several thousands of an inch, which is nevertheless critical to parallelism control. It is assumed that the relative spacing proximate to the molds is actually at a value S which is substantially uniform about the mold 24 (allowing for acceptable tolerances). It is also assumed that the relative platen spacing proximate to the left cylinder 32 has a value L that is significantly greater than the value S (owing to a local relative deflection of the upper and lower platens 12, 14) and that the relative platen spacing proximate to the right leveling cylinder 34 is at a slightly smaller value R, still in excess of the value S. In the control system of the present invention, such a spacing arrangement would be maintained (as explained more fully below), which is desirable since the platens 12, 14 are in fact substantially parallel in their critical central regions, proximate to the mold 24.

In the prior art, however, the controls would identify that the two corners of the platen are not spaced appropriately for a parallel relationship. The controls would actuate the leveling cylinders to attempt to produce common spacing at the corners. If, for example, the right leveling cylinder 34 were treated as a master reference cylinder, as in one prior art form of leveling control, then the operating pressure of the left cylinder 32 might be reduced with the object of reducing the relative platen spacing L to the value R. If the average platen spacing as sensed proximate to the four leveling cylinders serves as a reference value, as in another prior art form of leveling control, then the operating pressure of both cylinders might be adjusted, to equalize the spacing values L and R at some intermediate value (assuming that the other pair of cylinders are associated with comparable spacing values). In either case, the substantially parallel relationship of the platens 12, 14 proximate to the mold 24 is disturbed.

Figure 3:
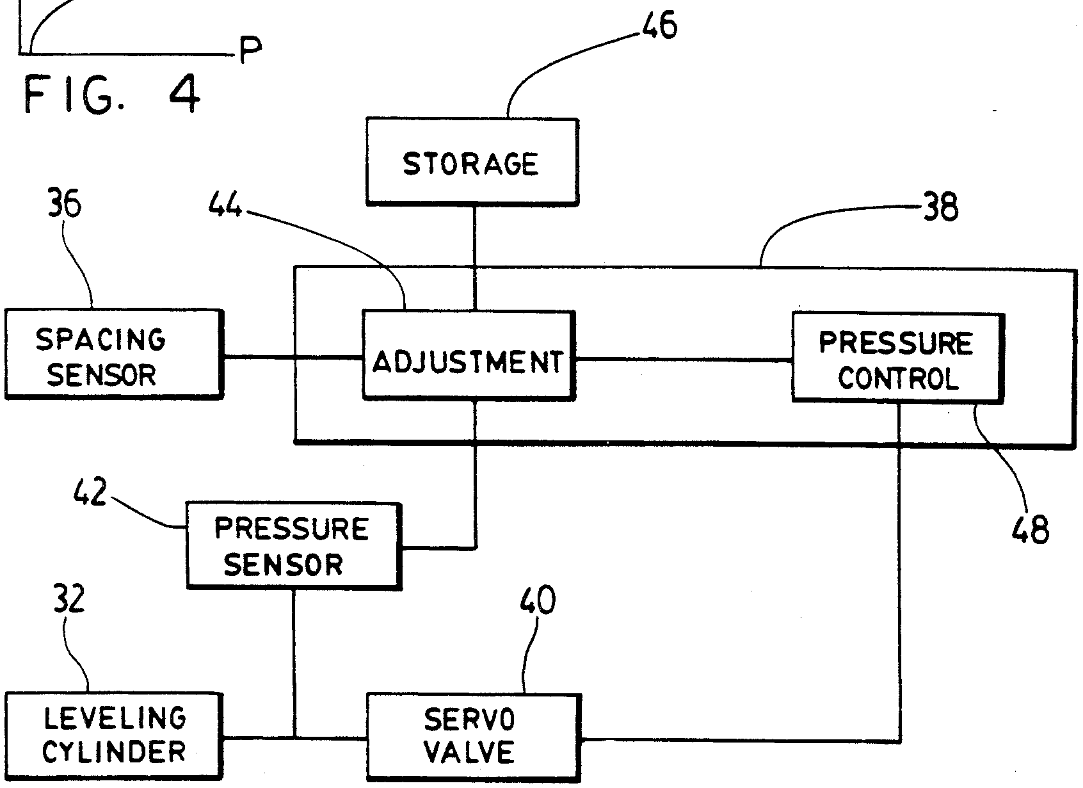
FIG. 3 diagrammatically illustrates a control system adapted to accommodate such local platen deflection; and, FIG. 4 diagrammatically illustrates stored data identifying expected local relative platen deflection for a particular leveling cylinder as a function of the operating pressure of the cylinder.

FIG. 3 diagrammatically illustrates the control system that regulates the leveling cylinders. Only components necessary for regulation of the left leveling cylinder 32 have been shown. The other leveling cylinders are regulated in a similar manner.

A controller 38 processes spacing and pressure signals and regulates operation of the leveling cylinder 32. The operating pressure of the leveling cylinder 32 is immediately controlled by a servovalve 40. A pressure sensor 42 produces a signal indicating the current operating pressure of the leveling cylinder 32. The spacing sensor 36 contained within the leveling cylinder 32 produces a signal indicating the relative platen spacing proximate to the cylinder 32 (the value L indicated in FIG. 2). Both sensor signals are received by an adjustment block 44 of the controller 38.

Figure 4:

The adjustment block 44 retrieves from a storage block 46 the data identifying the expected local relative platen deflection for the leveling cylinder 32 at its current operating pressure and for the particular operating conditions of the press 10 (primary the particular mold 24 and to a lesser extent the driving force). This data has been graphically represented in FIG. 4 as a curve indicating the relationship expected between such deflection D (indicated on a vertical axis) as a function of various operating pressures P (indicated on a horizontal axis). In this embodiment of the invention, the adjustment block 44 reduces the sensed spacer value L for the left cylinder 32 in accordance with the retrieved data identifying the expected local deflection, essentially subtracting the value of the expected deflection from the sensed spacing value S. The resulting adjusted spacing value conforms more closely to the actual platen spacing D proximate to the mold 24 (once again allowing for tolerable measure of platen deflection in the order of 0.001–0.002 inches per foot). In a similar manner, the adjusting block adjusts the sensed spacing value R associated with the right leveling cylinder 34 to conform more closely to the actual spacing between the molds and adjust those of the other leveling cylinders.

A cylinder control block 48 then actuates the servovalve 40 associated with the left cylinder 32 (and similar valves associated with the other leveling cylinders) to maintain all adjusted spacing signals at a common value. This causes the platen to remain substantially parallel in the vicinity of the mold 24, essentially preserving the spacing D observed in FIG. 2, for example. This arrangement effectively ignores peripheral deformation of the platens 12, 14, which is inconsequential to proper molding of the charge 26. It will be understood of course that the controller 38 otherwise implements, in a conventional manner, required velocity and pressure profiles appropriate for initial compression and ultimate curing of the charge 26. Such additional matters are well known, and will not be described.

Although the controller 38 is illustrated as distinct blocks and might be constructed of electronic components. the preferred implementation involves a microprocessor. The adjustment and control functions may be implemented as appropriate algorithms, stored on disk or otherwise, and executed by the microprocessor. The storage block 46 may be a conventional disk drive from which the expected relative deflection values for each leveling cylinder at its various operating pressures may be retrieved, for appropriate reduction of sensed spacing values. Alternatively, the stored data may be in the form of scaling factors (gain/attenuation) which are used to scale the sensed spacing value proximate to each leveling cylinder prior to regulation of the operating pressure of the cylinder. In either case, the data may be stored effectively as parameters of an equation specifying either the spacing reduction or scaling factors, rather than discrete items of deflection and pressure data. Rather than adjusting the sensed spacing value, the data indicating expected local relative platen deflection can be used to adjust reference signals (for example, a required spacing value for each leveling cylinder derived from a master leveling cylinder or an average spacing value calculated for all leveling cylinders) to achieve the same result. It will be appreciated that platen parallelism proximate to the mold 24 may be regulated in a variety of ways relying on the current operating pressure of a leveling cylinder, sensed platen spacing, and data indicating expected local platen deflection.

The deflection data required for each cylinder can be obtained in several ways. Finite element analysis or other estimating techniques can be used to model the platen and its expected response to operation of the leveling cylinders under various operating pressures. The same data may be used for all leveling cylinders, if appropriate symmetry can be assumed. It should be noted that the benefits of the invention can be obtained even if no exact compensation occurs.

A preferred method of generating the required data involves deriving it from actual operation of the press 10 on an exemplary workpiece in advance of actual production molding. The workpiece is preferably the particular mold 24 to be used and preferably containing a sacrificial molding charge. The workpiece may be positioned centrally between the upper and lower platens 12, 14. The ram 28 is then used to apply the driving force to the upper platen 12 to compress the workpiece. While the workpiece is being compressed, each leveling cylinder may be operated (separately or simultaneously) at various operating pressures. The sensors associated with the leveling cylinders are used to sense the local relative deflection of the platens 12, 14 proximate to each leveling cylinder, essentially as changes from a particular platen spacing value that serves as a datum. These sets of values are recorded in the storage block 46 as they are generated. For each leveling cylinder, the datum may be the platen spacing at any appropriate operating pressure, for example, a minimal pressure necessary to maintain contact with the upper platen, a pressure midway in the cylinder's operating range or the cylinder's maximum operating pressure. If the datum is the spacing for a nonzero operating pressure, the differential changes in spacing values recorded for a full range of operating pressures can be related to actual expected deflections at the various operating pressures by simply adding a common increment to each recorded differential spacing value. That increment is essentially the value required to reduce to zero the sensed differential change in spacing at a zero or near-zero operating pressure. It is preferred that this initial data-producing process be followed each time a new mold 24 is to be introduced between the platens 12, 14, using the particular mold 24. This provides more exact estimates of expected platen deflection for purposes of subsequent product production.

A preliminary calibration process is normal in the operation of such presses. Mold stops or a molding charge will be placed in the mold fixed to the press platens, and the ram operated to compress the mold. The spacing sensors are then effectively calibrated, establishing reference values for subsequent platen parallelism control. This is done whenever the press is shut-down and re-started. Such matters are well known to those skilled in the art and will not be described in detail.

The preliminary data-producing process associated with the present invention is preferably fully automated and incorporated into the preliminary calibration process otherwise required for operation of the press. The control system is of course coupled to the leveling cylinders through the servovalves to control their operation, to the pressure sensors to receive operating pressures of the cylinders, to the spacing sensors to receive local platen spacing proximate to each leveling cylinder, and to the storage means both to read and write data. The controller 38 may additionally be coupled to the ram 28 to actuate compression of the workpiece. In a data-recording mode of operation, the controller 38 operates the ram 28 to compress the mold 24, steps each of the leveling cylinders through its various operating pressures by appropriate control of the servovalves, and automatically records platen deflection in the storage block 46, the deflection values being sensed by the spacing sensors as differential spacing changes from a preselected datum, in the manner described above.

Control systems for regulating leveling cylinders are now largely microprocessor-based and operated by software algorithms. The necessary programming of a microprocessor-based controller 38 to add the additional control features of the present invention will be readily apparent to those skilled in the art, as will the necessary programming to implement the data-recording mode of operation as described above.

It will be appreciated that a particular embodiment of the invention has been described and that modifications may be made therein without departing from the spirit of the invention or necessarily departing from the scope of the appended claims.

I claim:

1. In a press comprising a pair of platens, a mold located between the platens substantially centrally relative to the platens, means for applying a driving force to one of the platens to displace the one platen towards the other platen thereby to compress a molding charge within the mold, and a plurality of leveling cylinders spaced from the mold and acting between the platens to apply forces varying with operating pressures of the leveling cylinders to the one platen to countervail the driving force, a method of controlling the leveling cylinders to maintain platen parallelism while the molding charge is being compressed, comprising:

providing data identifying for each of the leveling cylinders the local relative deflection of the platens expected in response to operation of the leveling cylinder at various operating pressures while the molding charge is being compressed;

sensing the current operating pressure of each of the leveling cylinders;

sensing for each of the leveling cylinders the relative spacing of the platens proximate to the leveling cylinders; and, controlling the operating pressures of the leveling cylinders in response to the relative spacing of the platens sensed for each of the leveling cylinders and in response to the data identifying the expected local relative platen deflection for each of the leveling cylinders at its current operating pressure thereby to maintain a substantially parallel relationship between the platens proximate to the mold.

2. The method of claim 1 in which the step of controlling the operating pressures of the leveling cylinders, comprises:

adjusting the relative platen spacing as sensed for each of the leveling cylinders according to the expected local relative deflection of the platens for the leveling cylinder at its sensed operating pressure such that the adjusted relative platen spacing for each of the leveling cylinders conforms more closely to the relative spacing of the platens proximate to the mold; and, adjusting the operating pressures of the leveling cylinders to maintain the adjusted relative platen spacing for each of the leveling cylinders at substantially a common value.

3. The method of claim 1 in which the step of providing the data comprises estimating the expected local relative deflection of the platens for each of the leveling cylinders at the various operating pressures.

4. The method of claim 1 in which the step of providing the data includes a preliminary process, prior to compressing the molding charge, comprising:

positioning a workpiece centrally between the platens;

applying the driving force to the one platen to advance the one platen toward the other platen and compressing the workpiece; and, while the workpiece is being compressed and for each of the leveling cylinders:

(a) operating the leveling cylinder at the various operating pressures, (b) sensing the local relative deflection of the platens proximate to the leveling cylinder, and (c) recording the sensed local relative deflection of the platens at the various operating pressures of the leveling cylinder.

5. The method of claim 4 in which the workpiece comprises the mold.

6. A press for compressing a molding charge within a mold, comprising:

a pair of platens;

platen displacing means for applying a driving force to one of the platens to displace the one platen towards the other platen thereby to compress the molding charge within the mold;

a plurality of leveling cylinders in a spacing arrangement permitting the mold to be positioned centrally between the pair of platens inset from the leveling cylinders, the leveling cylinders acting between the platens to apply forces to the one platen varying with operating pressures of the leveling cylinders to countervail the driving force;

means for providing data identifying for each of the leveling cylinders the local relative deflection of the platens expected in response to operation of the leveling cylinder at various operating pressures while the molding charge is being compressed;

pressure sensing means for sensing the current operating pressure of each of the leveling cylinders;

spacing sensing means for sensing for each of the leveling cylinders the relative spacing of the platens proximate to the leveling cylinders; and, control means for controlling the operating pressures of the leveling cylinders in response to the relative spacing of the platens sensed for each of the leveling cylinders and in response to the data identifying the expected local relative platen deflection for each of the leveling cylinders at its current operating pressure thereby to maintain a substantially parallel relationship between the platens proximate to the mold.

7. The press of claim 6 in which the control means comprise:

means for adjusting the relative platen spacing as sensed for each of the leveling cylinders according to the expected local relative deflection of the platens for the leveling cylinder at its current operating pressure such that the adjusted relative platen spacing for each of the leveling cylinders conforms more closely to the relative spacing of the platens proximate to the mold; and, means for adjusting the operating pressures of the leveling cylinders to maintain the adjusted relative platen spacing for each of the leveling cylinders at substantially a common value.

8. The press of claim 6 in which the data-providing means comprise means for storing the expected local relative deflection of the platens for each of the leveling cylinders at the various operating pressures.

9. The press of claim 8 in which the control means comprise a data-recording mode of operation and in which the control means are coupled to the platen displacing means, the leveling cylinders, and the storing means such that, in the data-recording mode, the control means:

actuate the platen displacing means to apply the driving force to the one platen thereby to advance the one platen toward the other platen to compress a workpiece located centrally between the platens;

operate each of the leveling cylinders at the various operating pressures while the workpiece is being compressed; and, cause the storing means to store the local relative deflection of the platens sensed by the spacing sensing means for each of the leveling cylinders during operation of the leveling cylinder at the various operating pressures.

10. Apparatus for adapting a pressing comprising a pair of platens, and platen displacing means for applying a driving force to one of the platens to displace the one platen towards the other platen thereby to compress a molding charge within a mold positioned centrally between the platens to maintain platen parallelism while the molding charge is being compressed, comprising:

a plurality of leveling cylinders adapted to be located between the platens in a spacing arrangement permitting the mold to be positioned centrally between the pair of platens inset from the leveling cylinders and to act between the platens to apply forces to the one platen varying with operating pressures of the leveling cylinders thereby to countervail the driving force;

means for providing data identifying for each of the leveling cylinders the local relative deflection of the platens expected in response to operation of the leveling cylinder at various operating pressures while the molding charge is being compressed;

pressure sensing means for sensing the current operating pressure of each of the leveling cylinders;

spacing sensing means for sensing for each of the leveling cylinders the relative spacing of the platens proximate to the leveling cylinders; and, control means for controlling the operating pressures of the leveling cylinders in response to the relative spacing of the platens sensed for each of the leveling cylinders and in response to the data identifying the expected local relative platen deflection for each of the leveling cylinders at its current operating pressure thereby to maintain a substantially parallel relationship between the platens proximate to the mold.

11. The apparatus of claim 10 in which the control means comprise:

means for adjusting the relative platen spacing as sensed for each of the leveling cylinders according to the expected local relative deflection of the platens for the leveling cylinder at its current operating pressure such that the adjusted relative platen spacing for each of the leveling cylinders conforms more closely to the relative spacing of the platens proximate to the mold; and, means for adjusting the operating pressures of the leveling cylinders to maintain the adjusted relative platen spacing for each of the leveling cylinders at substantially a common value.

12. The apparatus of claim 11 in which the data-providing means comprise means for storing the expected local relative deflection of the platens for each of the leveling cylinders at the various operating pressures.

13. The apparatus of claim 12 in which the control means comprise a data-recording mode of operation in which the control means:

actuate the platen displacing means to apply the driving force to the one platen thereby to advance the one platen toward the other platen to compress a workpiece located centrally between the platens;

operate each of the leveling cylinders at the various operating pressures while the workpiece is being compressed; and, cause the storing means to store the local relative deflection of the platens sensed by the spacing sensing means for each of the leveling cylinders during operation of the leveling cylinder at the various operating pressures.

* * * * *